United States Patent
Jeong et al.

(10) Patent No.: US 9,679,395 B2
(45) Date of Patent: Jun. 13, 2017

(54) METHOD AND APPARATUS FOR IMAGE PROCESSING

(71) Applicant: Samsung Electronics Co., Ltd., Suwon-Si, Gyeonggi-Do (KR)

(72) Inventors: Young Ju Jeong, Yongin-si (KR); Ji Won Kim, Seoul (KR); Dong Kyung Nam, Yongin-si (KR); Du-Sik Park, Suwon-si (KR); Yang Ho Cho, Seongnam-si (KR); Hyo Seok Hwang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 140 days.

(21) Appl. No.: 14/603,737

(22) Filed: Jan. 23, 2015

(65) Prior Publication Data
US 2015/0213607 A1 Jul. 30, 2015

(30) Foreign Application Priority Data

Jan. 24, 2014 (KR) .................. 10-2014-0009078

(51) Int. Cl.
*G06T 7/00* (2017.01)

(52) U.S. Cl.
CPC ...... *G06T 7/97* (2017.01); *G06T 2207/20228* (2013.01)

(58) Field of Classification Search
CPC .............. G06T 7/0075; G06T 2207/10012
USPC ......................................... 345/427
See application file for complete search history.

(56) References Cited

U.S. PATENT DOCUMENTS

| 2009/0010507 | A1* | 1/2009 | Geng ............... G06T 7/0075 382/128 |
| 2010/0053416 | A1 | 3/2010 | Chen et al. |
| 2011/0255775 | A1* | 10/2011 | McNamer ......... G06T 7/0075 382/154 |
| 2011/0316963 | A1 | 12/2011 | Li et al. |
| 2012/0114224 | A1 | 5/2012 | Xu et al. |
| 2012/0162379 | A1* | 6/2012 | Dahi ............... H04N 5/23254 348/47 |
| 2012/0293667 | A1 | 11/2012 | Baba et al. |
| 2014/0043447 | A1* | 2/2014 | Huang ............. H04N 13/0425 348/51 |
| 2014/0211989 | A1* | 7/2014 | Ding ............... G06K 9/6211 382/103 |

(Continued)

FOREIGN PATENT DOCUMENTS

| JP | 2000-308090 A | 11/2000 |
| KR | 2008-0101998 A | 11/2008 |

(Continued)

OTHER PUBLICATIONS

Fleck, M., A topological stereo matcher. Aug. 1991, International Journal of Computer Vision, 6(3):197-226.*

*Primary Examiner* — Thomas Lett
(74) *Attorney, Agent, or Firm* — Harness, Dickey & Pierce, P.L.C.

(57) ABSTRACT

At least one example embodiment discloses an imaging apparatus that may receive input images with different viewpoints, obtain information associated with the input images, and generate a new viewpoint image based on the received input images and the obtained information and thus, reduce an information loss of the new viewpoint image for the input images.

18 Claims, 9 Drawing Sheets

(56) References Cited

U.S. PATENT DOCUMENTS

2014/0293007 A1* 10/2014 Angot .................. H04N 13/026
                348/45

FOREIGN PATENT DOCUMENTS

| KR | 10-0912074 B1 | 8/2009 |
|---|---|---|
| KR | 2010-0002799 A | 1/2010 |
| KR | 2010-0108021 A | 10/2010 |
| KR | 2011-0003611 A | 1/2011 |
| KR | 2011-0006360 A | 1/2011 |
| KR | 2011-0052993 A | 5/2011 |
| KR | 20120119905 A | 10/2012 |
| KR | 2012-0133041 A | 12/2012 |
| KR | 20130035862 A | 4/2013 |
| KR | 20130063995 A | 6/2013 |

* cited by examiner

METHOD AND APPARATUS FOR IMAGE PROCESSING

CROSS-REFERENCE TO RELATED APPLICATION

This application claims the priority benefit of Korean Patent Application No. 10-2014-0009078, filed on Jan. 24, 2014, in the Korean Intellectual Property Office, the entire disclosure of which is incorporated herein by reference.

BACKGROUND

1. Field

Example embodiments of the following description relate to image processing, and more particularly, to a method and an apparatus for image processing that may generate a new viewpoint image based on input images.

2. Description of the Related Art

A new viewpoint image of multiview input images may be generated through interpolation or extrapolation performed on the input images.

Cameras capturing the input images may be positioned in different environments. Thus, to generate the new viewpoint image through interpolation or extrapolation using the input images, calibration and warping may be performed on each input image based on the environments in which the cameras capture the input images. The new viewpoint image may be generated from the calibrated and warped images based on the environments in which the cameras capture the input images.

The calibrated and the warped images may include a black region. To remove the black region, the new viewpoint image generated from the calibrated and the warped images may be cropped. However, the cropping may cause information loss when generating the new viewpoint image.

SUMMARY

The foregoing and/or other aspects are achieved by providing an image processing method including calculating a motion vector of points corresponding to input images with different viewpoints based on homography information and disparity information on the input images, the homography information being based on calibration information and rectification information on the input images, and generating a new viewpoint image from the input images based on the motion vector.

The calibration information may include rotation information for rectification of the input images.

The rectification information may include parameters associated with rectified input images.

The input images may include a left input image and a right input image.

A viewpoint part of the new viewpoint image is between a viewpoint part of the left input image and a viewpoint part of the right input image.

The input images may include a first input image and a second input image.

The homography information includes first homography information on the first input image and second homography information on the second input image.

The calculating of the motion vector includes calculating a second point of a first rectified image corresponding to a first point of the first input image based on the first homography information.

The calculating of the motion vector may include calculating a third point of a second rectified image corresponding to the second point based on the disparity information.

The calculating of the motion vector may include calculating a fourth point of the second input image corresponding to the third point based on the second homography information.

The calculating of the motion vector may include calculating the motion vector, the motion vector indicating a motion between the first point and the fourth point.

The image processing method may further include obtaining the calibration information, the rectification information, and the disparity information.

The obtaining the calibration information, the rectification information, and the disparity information may include receiving at least one set of information among the calibration information, the rectification information, and the disparity information, and generating remaining information, excluding the at least one received set of information, based on the at least one received set of information and the input images.

The obtaining the calibration information, the rectification information, and the disparity information may include receiving the calibration information.

The obtaining the calibration information, the rectification information, and the disparity information may include generating the rectification information by performing the rectification on the input images based on the calibration information and the input images.

The obtaining the calibration information, the rectification information, and the disparity information may include obtaining the disparity information by calculating disparities based on the rectification.

The image processing method may further include calculating an information loss of cropped images for the input images.

The cropped images may be obtained by cropping performed concurrently with the rectification.

The calculating the motion vector and the generating the new viewpoint image may be performed when the information loss is greater than or equal to a value.

The foregoing and/or other aspects are achieved by providing an imaging apparatus including a motion vector calculator configured to calculate a motion vector of points corresponding to input images with different viewpoints based on homography information and disparity information on the input images, the homography information being based on calibration information and rectification information on the input images, and an image generator to generate a new viewpoint image from the input images based on the motion vector.

The calibration information may include rotation information for rectification of the input images.

The input images may include a first input image and a second input image.

The motion vector calculator is configured to calculate a second point of a first rectified image corresponding to a first point of the first input image based on a part of the homography information corresponding to the first input image.

The motion vector calculator calculates a third point of a second rectified image corresponding to the second point based on the disparity information.

The motion vector calculator may calculate a fourth point of the second input image corresponding to the third point based on another part of the homography information corresponding to the second input image.

The motion vector calculator may calculate the motion vector indicating a motion between the first point and the fourth point. The imaging apparatus may further include an information acquirer configured to obtain the homography information on the input images based on the calibration information and the rectification information.

The information acquirer is configured to obtain the calibration information, the rectification information, and the disparity information.

The information acquirer may obtain the homography information based on the obtained calibration information and the obtained rectification information.

The information acquirer is configured to receive at least one set of information among the calibration information, the rectification information, and the disparity information.

The information acquirer may generate remaining information, excluding the at least one received set of information, based on the at least one received set of information and the input images.

The information acquirer is configured to receive the calibration information.

The information acquirer may generate the rectification information by performing rectification on the input images based on the calibration information and the input images.

The information acquirer is configured to obtain the disparity information by calculating disparities of images generated by performing the rectification.

The information acquirer is configured to calculate an information loss of cropped images for the input images.

The cropped images based on cropping performed concurrent with the rectification.

If the information loss is greater than or equal to a value, the motion vector calculator is configured to calculate the motion vector, and the image generator is configured to generate the new viewpoint image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
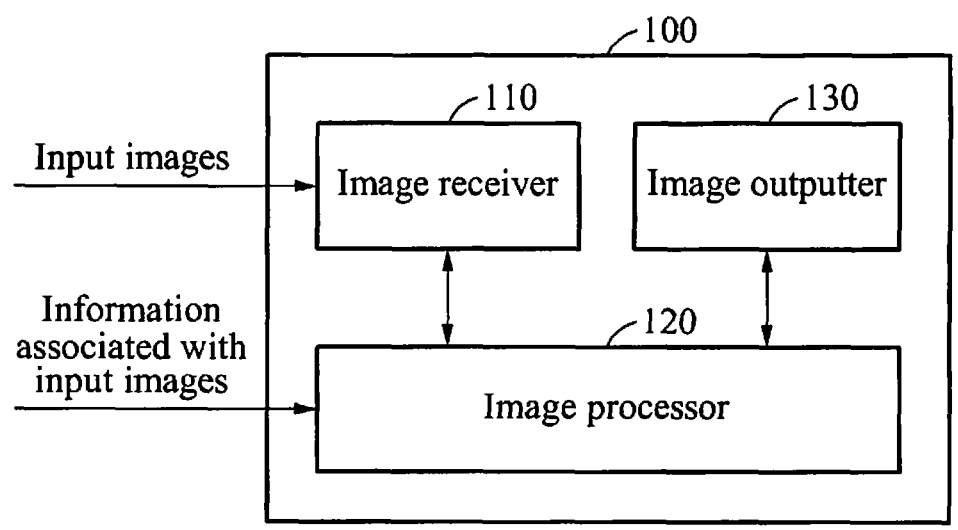
FIG. 1 is a diagram illustrating an imaging apparatus according to example embodiments.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems. Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

An image or images described herein may refer to data of the image or the images. For example, receiving, processing, and outputting the image or the images may indicate receiving, processing, and outputting the data of the image or the images, respectively.

FIG. 1 is a diagram illustrating an imaging apparatus 100 according to example embodiments.

The imaging apparatus 100 may include an image receiver 110, an image processor 120, and an image outputter 130.

The imaging apparatus 100 may receive input images with different viewpoints and obtain information associated with the input images.

The imaging apparatus 100 may generate a new viewpoint image based on the received input images and the obtained information associated with the input images. A viewpoint of the new viewpoint image may differ from the viewpoints of the input images. Thus, the imaging apparatus 100 may generate an image with a new viewpoint.

The generated new viewpoint image and the input images may be used to generate a three-dimensional (3D) image.

For example, the imaging apparatus 100 may be included in a multiview 3D display device or a portion of the multiview 3D display device.

The imaging apparatus 100 may generate the new viewpoint image based on original input images on which calibration and warping are not performed, namely, not based on calibrated and/or wrapped input images. The warping of the input images may indicate rectification of the input images. The rectification may indicate a method of processing the input images to parallelize epipolar lines of the input images.

The image receiver 110 may receive the input images with different viewpoints. The input images may be received from an external device in lieu of the imaging apparatus 100. For example, the input images may be received from a stereo camera or at least one camera. Alternatively, although not illustrated, the input images may refer to images stored in a storage (not shown) included in the imaging apparatus 100.

The input images with different viewpoints may refer to images captured by the stereo camera. Also, the input images may refer to images captured by cameras positioned at different locations.

The image receiver 110 may transmit the received input images to the image processor 120.

Although not illustrated, the image receiver 110 may receive the information associated with the input images from an external source. The image receiver 110 may transmit the information associated with the received input images to the image processor 120. The information associated with the input images may include at least one set of information among calibration information on the input images, rectification information on the input images, and disparity information on the input images. For example, the information associated with the input images may include the calibration information on the input images, the rectification information on the input images, and the disparity information on the input images.

The image processor 120 may obtain the information associated with the input images and generate the new viewpoint image based on the input images and the information associated with the input images. The image processor 120 may obtain the information associated with the input images. The information may be received and generated based on the input images. Thus, the obtaining of the information may include reception of the information and generation of the information.

The image processor 120 may process calculations required to obtain the information associated with the input images and calculations required to generate the new viewpoint image.

The image outputter 130 may output the new viewpoint image generated by the image processor 120. The image outputter 130 may be a hardware module used to output the new viewpoint image. The image outputter 130 may include a port used to output the new viewpoint image. For example, the image outputter 130 may output the new viewpoint image to the multiview 3D display device.

Components included in the image processor 120 and functions of the components will be further described with reference to FIGS. 2 through 9.

Figure 2:
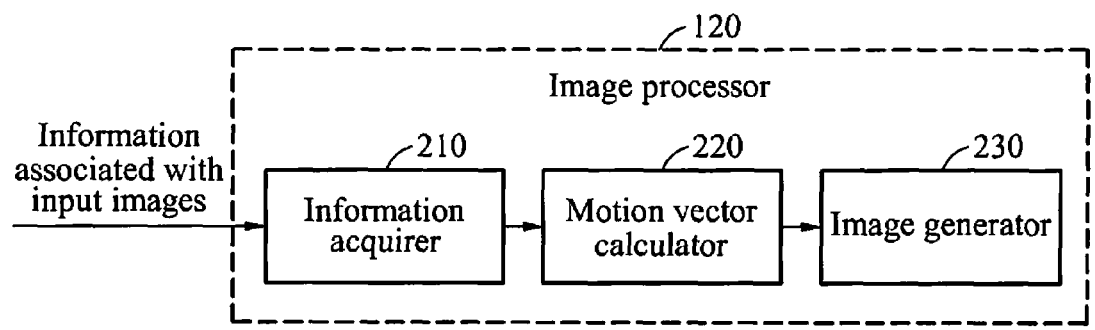
FIG. 2 is a diagram illustrating an image processor including an information acquirer, a motion vector calculator, and an image generator according to example embodiments.

FIG. 2 is a diagram illustrating the image processor 120 including an information acquirer 210, a motion vector calculator 220, and an image generator 230 according to example embodiments.

Referring to FIG. 2, the image processor 120 includes the information acquirer 210, the motion vector calculator 220, and the image generator 230.

The information acquirer 210, the motion vector calculator 220 and the image generator 230 may be hardware, firmware, hardware executing software or any combination thereof. When at least one of the information acquirer 210, the motion vector calculator 220 and the image generator 230 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the information acquirer 210, the motion vector calculator 220 and the image generator 230. CPUs, DSPs, ASICs and FPGAs may generally be referred to as processors and/or microprocessors.

In the event where at least one of the information acquirer 210, the motion vector calculator 220 and the image generator 230 is a processor executing software, the processor is configured as a special purpose machine to execute the software, stored in a storage medium, to perform the functions of the at least one of the information acquirer 210, the motion vector calculator 220 and the image generator 230. In such an embodiment, the processor may include one or more Central Processing Units (CPUs), digital signal processors (DSPs), application-specific-integrated-circuits (ASICs), field programmable gate arrays (FPGAs) computers.

The information acquirer 210 may obtain information associated with input images. For example, the information associated with the input images may include calibration information on the input images, rectification information on the input images, and disparity information on the input images. Alternatively, the information acquirer 210 may obtain homography information on the input images based on the calibration information and the rectification information on the input images.

The motion vector calculator 220 may calculate a motion vector of points corresponding to the input images based on the homography information obtained based on the calibration information and the rectification information on the input images and the disparity information on the input images.

The image generator 230 may generate an image with a new viewpoint image from the input images based on the generated motion vector.

The generated new viewpoint image may be output through the image outputter 130.

The information associated with the input images obtained by the information acquirer 210 and a method of generating the new viewpoint image by the motion vector calculator 220 and the image generator 230 will be further described with reference to FIGS. 3 through 9.

Figure 3:
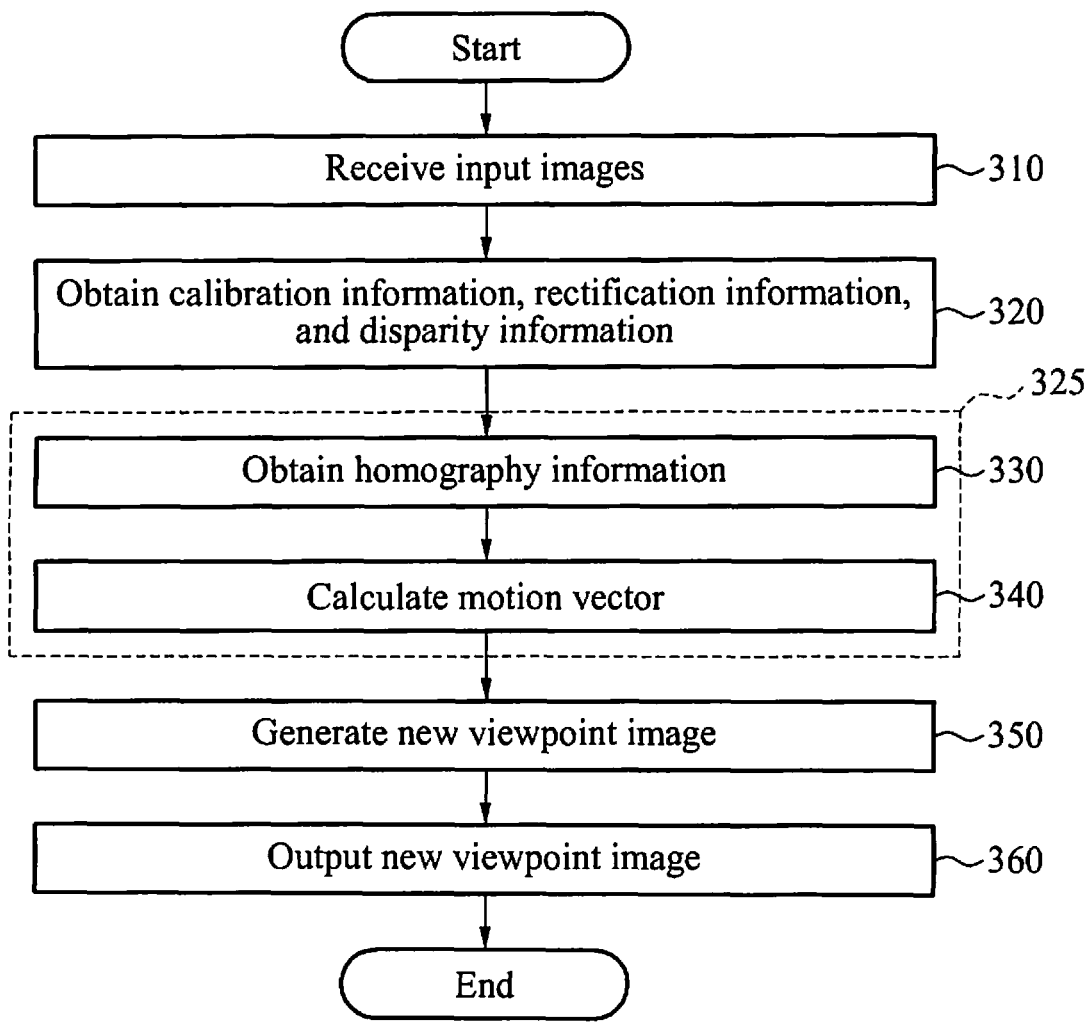
FIG. 3 is a flowchart illustrating an image processing method according to example embodiments.

FIG. 3 is a flowchart illustrating an image processing method according to example embodiments.

The image processing method to be described with reference to FIG. 3 may be performed by the image processor 120 of the imaging apparatus 100 described with reference to FIG. 1.

In operation 310, the image receiver 110 receives input images with different viewpoints. For example, the input images may be multiview input images. The input images may include a left input image and a right input image. A viewpoint of the left input image among the input images may be present further to a leftward direction than a viewpoint of the right input image.

In operation 320, the information acquirer 210 of the image processor 120 obtains information associated with the input images, for example, calibration information on the input images, rectification information on the input images, and disparity information on the input images.

The information acquirer 210 may obtain calibration information on each input image.

Calibration of an input image may be an operation performed to obtain calibration parameters required to project an image captured by a camera on a two-dimensional (2D) plane.

The calibration information obtained by the information acquirer 210 may include the calibration parameters.

The calibration parameters may include extrinsic camera parameters and intrinsic camera parameters.

The intrinsic camera parameters may include parameters associated with at least one of a focal distance, an aspect ratio, and a central point of a camera capturing each input image.

The extrinsic camera parameters may include parameters associated with a geometric position of each camera in a space in which each input image is captured, for example, a height and a direction of the camera.

For example, the calibration information obtained by the information acquirer 210 may include rotation information for rectification of the input images. The rotation information for the rectification of the input images may include parameters required to perform the rectification, for example, parameters associated with an angle at which each input image is required to rotate. The rotation information on each input image may be determined based on the geometric position of each camera in the space in which each input image is captured.

The calibration information on each input image may be a matrix including the calibration parameters as elements. For example, the calibration information on each input image may indicate a rotation matrix including the parameters associated with the angle at which each input image is required to rotate as the elements. The rotation matrix of each input image may be used as the calibration information to obtain a homography matrix used to generate the new viewpoint image to be described hereinafter.

The rectification information may be obtained by performing the rectification on the input images. The rectification of the input images may be performed based on the input images and the calibration information.

The rectification information may include parameters associated with rectified input images. For example, the rectification information may include rotation information shared by the rectified input images. The rotation information may include rotation parameters shared by the rectified input images.

The rectification information may be a rectification matrix including the rotation parameters shared by the rectified input images as elements. The rectification matrix of the input images may be used as the rectification information to obtain the homography matrix used to generate the new viewpoint image to be described hereinafter.

The calibration information and the rectification information obtained by the information acquirer 210 will be further described with reference to FIG. 6.

The disparity information on the input images obtained by the information acquirer 210 may be obtained based on the rectified input images. For example, a dense stereo matching algorithm, a local matching algorithm, or a global matching algorithm may be used to calculate disparities for obtaining the disparity information.

Alternatively, the disparity information on each input image may be obtained by a sensor when generating the input images.

The information acquirer 210 may obtain at least one set of information among the calibration information on the input images, the rectification information on the input images, and the disparity information on the input images by receiving the at least one set of information from an external source. For example, the at least one set of information among the calibration information, the rectification information, and the disparity information may be generated from the external source, for example, an external device, and transmitted to the information acquirer 210 subsequent to the generation.

The information acquirer 210 may obtain one or two sets of information among the calibration information, the rectification information, and the disparity information by receiving the one or two sets of the information. The information acquirer 210 may obtain remaining information, excluding the received one or two sets of information, by generating the remaining information based on the received one or two sets of information and the input images. For example, the image processor 120 may externally receive the calibration information on the input images, and generate the rectification information and the disparity information based on the received calibration information and the input images.

A method of obtaining the rectification information and the disparity information on the input images by the information acquirer 210 will be further described with reference to FIG. 5.

In operation 325, the motion vector calculator 220 of the image processor 120 calculates a motion vector of points corresponding to the input images based on the homography information obtained based on the calibration information and the rectification information on the input images and the disparity information on the input images. The calibration information and the rectification information may be obtained by the information acquirer 210. Operation 325 may include operations 330 and 340 to be described hereinafter.

In operation 330, the information acquirer 210 obtains homography information on each of the input images based on the calibration information and the rectification information on the input images.

The homography information on each input image may be the homography matrix used to convert an input image to a rectified image. A relationship among the homography matrix, a point of the input image, and a point of the rectified image corresponding to the input image may be represented by Equation 1.

$$H \cdot \begin{pmatrix} x \\ y \\ 1 \end{pmatrix} = c \cdot \begin{pmatrix} x^{rec} \\ y^{rec} \\ 1 \end{pmatrix} \quad \text{[Equation 1]}$$

In Equation 1, "H" may denote a homography matrix of an input image. "x" and "y" may denote an x coordinate and a y coordinate, respectively, of an arbitrary point of the input image projected on a two-dimensional (2D) plane. "$x^{rec}$" and "$y^{rec}$" may denote an x coordinate and a y coordinate, respectively, of a point of a rectified image corresponding to the coordinates of the arbitrary point of the input image. "c" may denote a scalar value, and a value that may allow 3×1 matrices on both sides indicating coordinate values of the point of the input image and coordinate values of the point of the rectified image to correspond to one another. For example, the homography matrix may transform the coordinate of the point of the input image into the coordinate of the point of the rectified image.

When the input images received by the image receiver 110 include a left input image and a right input image, a homography matrix of the left input image and a homography matrix of the right input image may be calculated based on Equations 2 and 3.

$$\begin{cases} R_L \cdot H_L = R \\ H_L = R_L^{-1} \cdot R \end{cases} \quad \text{[Equation 2]}$$

In Equation 2, "$R_L$" may indicate calibration information on the left input image. Also, $R_L$ may denote a rotation matrix for rectification of the left input image. "R" may indicate rectification information on the left input image and the right input image. Also, R may denote a rectification matrix. "$H_L$" may denote the homography matrix of the left input image.

$$\begin{cases} R_R \cdot H_R = R \\ H_R = R_R^{-1} \cdot R \end{cases} \quad \text{[Equation 3]}$$

In Equation 3, "$R_R$" may indicate calibration information on the right input image. Also, $R_R$ may denote a rotation matrix for rectification of the right input image. "R" may indicate the rectification information on the left input image and the right input image. Also, R may denote a rectification matrix. "$H_R$" may denote the homography matrix of the right input image.

The homography matrix obtained based on Equation 2 and Equation 3 may be used as the homography information to calculate a motion vector for generating the new viewpoint image to be described along with the disparity information on the input images.

In operation 340, the motion vector calculator 220 calculates the motion vector of the points corresponding to the input images based on the homography information obtained in operation 330 and the input images. The motion vector calculator 220 calculates the motion vector of the coordinates of the points corresponding to the input images.

The points corresponding to the input images may indicate positions of corresponding objects in the input images, or coordinates of the corresponding objects in the images. The corresponding objects may indicate a single identical subject in the input images. The single identical subject may appear at different positions and in different forms in the input images based on viewpoints of the input images.

The points corresponding to the input images may correspond to positions or coordinates of pixels at which the input images are output. The points corresponding to the input images may indicate pixels of the input images that may indicate a single position in a scene. The single position in the scene or the points may be indicated as the pixels at different positions and of different colors in the input images based on the viewpoints of the input images. For example, the motion vector may be calculated based on the positions of the pixels at which the input images indicating the corresponding objects are output.

The motion vector may indicate a vector of a motion of the points corresponding to the input images. For example, the motion vector may be the vector of the motion of the positions of the corresponding objects in the input images or the coordinates of the corresponding objects in the input images. The motion of the positions may indicate a change of the positions.

For example, when the input images include the left input image and the right input image, the motion vector may be a vector indicating the change of the positions, or the motion, of corresponding objects in the left input image and the right input image, for example, the change of the positions from a position of the corresponding objects in the left input image to a position of the corresponding objects in the right input image. Alternatively, the motion vector may be a vector indicating a change of the coordinates, or the motion, of corresponding pixels in the left input image and the right input image, for example, the change of the coordinates from a coordinate of the corresponding pixels in the left input image to a coordinate of the corresponding pixels in the right input image.

Relationships among the foregoing images, the positions, and the pixels may be identically applicable to the following descriptions.

A method of calculating the motion vector of the points corresponding to the input images by the motion vector calculator 220 based on the homography information and the input images will be further described with reference to FIGS. 4 and 7.

In operation 350, the image generator 230 of the image processor 120 generates the new viewpoint image from the input images based on the motion vector calculated in operation 340. When the input images include the left input image and the right input image, a viewpoint of the new viewpoint image may be present between a viewpoint of the left input image and a viewpoint of the right input image. The viewpoint of the new viewpoint image may be present further toward a leftward direction of the viewpoint of the left input image or present further toward a rightward direction of the viewpoint of the right input image.

A method of generating the new viewpoint image by the image generator 230 will be further described with reference to FIG. 8.

In operation 360, the image outputter 130 outputs the new viewpoint image generated in operation 350.

The new viewpoint image may be used to generate a 3D image. For example, the image outputter 130 may output the new viewpoint image and the input images to the multiview 3D display device. A viewer of the multiview 3D display device may recognize the 3D image through the new viewpoint image and multiview images of the input images.

Technical descriptions provided with reference to FIGS. 1 and 2 may be applicable hereto and thus, repeated descriptions will be omitted here for brevity.

Figure 4:
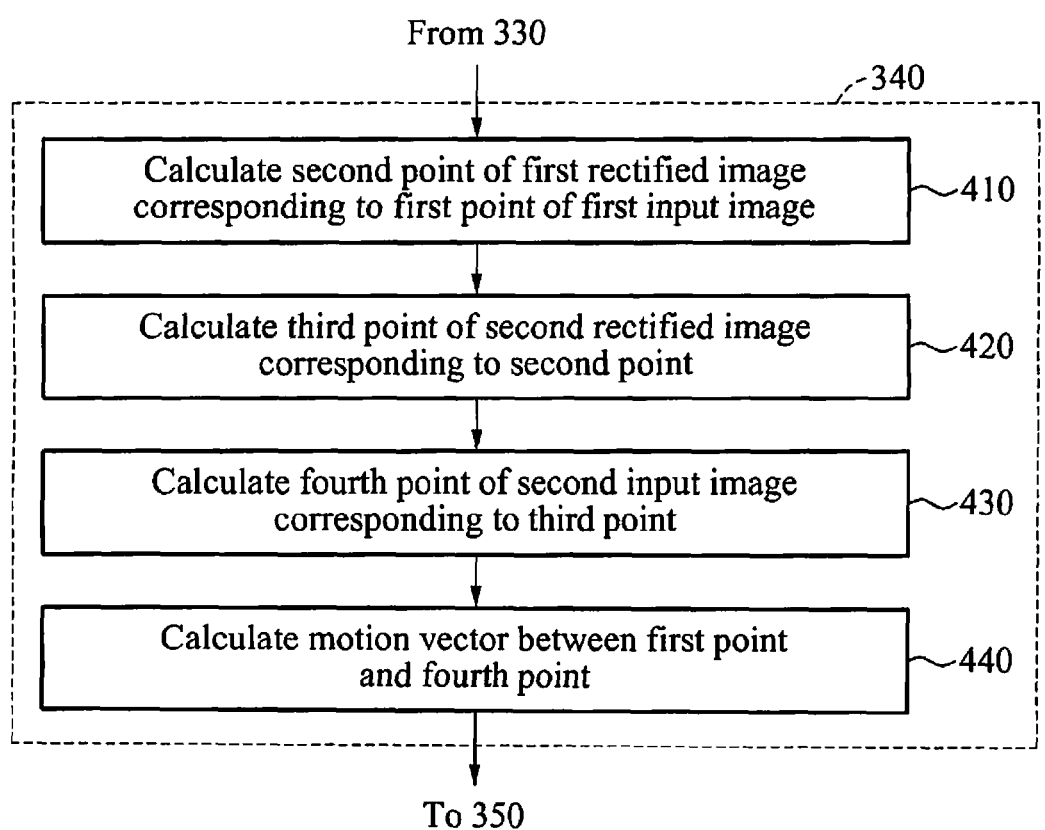
FIG. 4 is a flowchart illustrating a method of calculating a motion vector according to example embodiments.

FIG. 4 is a flowchart illustrating a method of calculating a motion vector according to example embodiments.

Operation 340 described with reference to FIG. 3 may include operations 410 through 440 to be described hereinafter with reference to FIG. 4.

Input images received by the image receiver 110 may include a first input image and a second input image. One of the first input image and the second input image may correspond to the left input image described with reference to FIG. 3 and the other may correspond to the right input image described with reference to FIG. 3.

In operation 330, the information acquirer 210 obtains first homography information on the first input image and second homography information on the second input image based on calibration information on the input images and rectification information on the input images. For example, the obtained homography information may include homography information on the first input image and homography information on the second input image.

The first homography information may be a homography matrix of the first input image, and the second homography information may be a homography matrix of the second input image.

The motion vector calculator 220 may calculate a motion vector indicating a motion between a first point of the first input image and a fourth point of the second image based on the obtained first homography information and the obtained second homography information and the first input image and the second input image. The fourth point may be a point corresponding to the first point.

In operation 410, the motion vector calculator 220 calculates a second point of a first rectified image corresponding to the first point of the first input image based on the first homography information. The first rectified image may be a rectified image of the first input image. For example, the motion vector calculator 220 may calculate a coordinate of the second point of the first rectified image by multiplying a matrix indicating a coordinate of the first point of the first input image and a first homography matrix together. The second point may be a point corresponding to the first point.

In operation 420, the motion vector calculator 220 calculates a third point of a second rectified image corresponding to the second point based on the disparity information on the first input image and the second input image. For example, the motion vector calculator 220 may calculate a coordinate of the third point of the second rectified image from the coordinate of the second point based on a disparity between the first rectified image and the second rectified image included in the disparity information. The third point may be a point corresponding to the second point.

Epipolar lines of the first rectified image and the second rectified image may be parallel to one another and thus, the second point and the third point may be different from each other only in x-axis coordinate values.

The second rectified image may correspond to a rectified image of the second input image.

In operation 430, the motion vector calculator 220 calculates the fourth point of the second input image corresponding to the third point based on the second homography information on the second input image. For example, the motion vector calculator 220 may calculate the fourth point of the second input image by multiplying an inverse matrix of a second homography matrix and a matrix indicated by the coordinate of the third point together.

The first point and the fourth point may indicate points corresponding to the first input image and the second input image, respectively. Also, the first point and the fourth point may be points indicating each corresponding objects in the first input image and the second input image.

In operation 440, the motion vector calculator 220 calculates the motion vector indicating a motion between the first point and the fourth point.

The method of calculating the motion vector will be further described with reference to FIG. 7.

The image generator 230 may generate a new viewpoint image based on the motion vector calculated based on the first input image, the second input image, and the motion between the first point and the fourth point.

Technical descriptions provided with reference to FIGS. 1 through 3 may be applicable hereto and thus, repeated descriptions will be omitted here for brevity.

Figure 5:
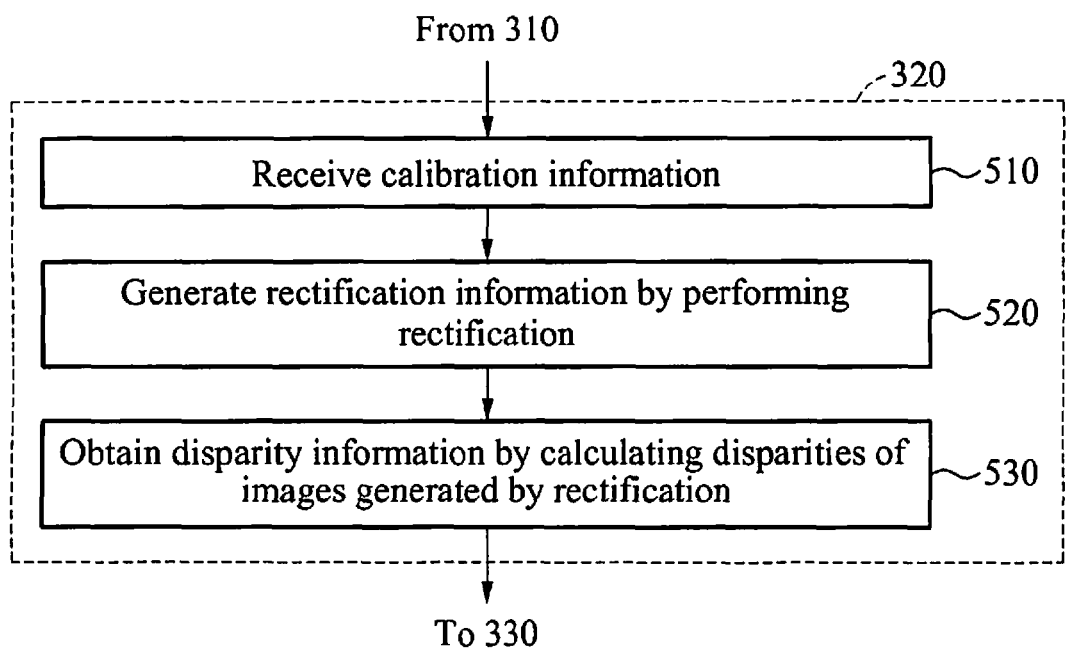
FIG. 5 is a flowchart illustrating a method of obtaining calibration information, rectification information, and disparity information according to example embodiments.

FIG. 5 is a flowchart illustrating a method of obtaining calibration information, rectification information, and disparity information according to example embodiments.

Operation 320 described with reference to FIG. 3 may include operations 510 through 530 to be described hereinafter with reference to FIG. 5.

As described with reference to FIG. 3, one or two sets of information among the calibration information, the rectification information, and the disparity information may be obtained by receiving the one or two sets of information, and remaining information excluding the one or two sets of information may be obtained by generating the remaining information based on the received one or two sets of information and input images.

In operation 510, the information acquirer 210 receives the calibration information. For example, the information acquirer 210 may receive the calibration information from an external device.

Also, the calibration information may be transmitted to the image receiver 110 along with the input images from the external device or to the information acquirer 210 separately from the input images from the external device.

In operation 520, the information acquirer 210 generates the rectification information by performing rectification on the input images based on the calibration information and the input images. For example, the information acquirer 210 may perform the rectification on the input images based on calibration parameters included in the calibration information, and perform the rectification to obtain a rectification matrix which is the rectification information.

In operation 530, the information acquirer 210 obtains the disparity information by calculating disparities of images generated by performing the rectification. The images generated by performing the rectification may be rectified input images. Epipolar lines of the rectified images may be parallel to one another and thus, a line by line disparity between the rectified images may be calculated.

However, when the information acquirer 210 receives the disparity information on the input images from the external device, for example, a sensor, operation 530 may not be performed.

The calibration information and the rectification information obtained by the information acquirer 210 will be further described with reference to FIG. 6.

Technical descriptions provided with reference to FIGS. 1 through 4 may be applicable hereto and thus, repeated descriptions will be omitted here for brevity.

Figure 6:
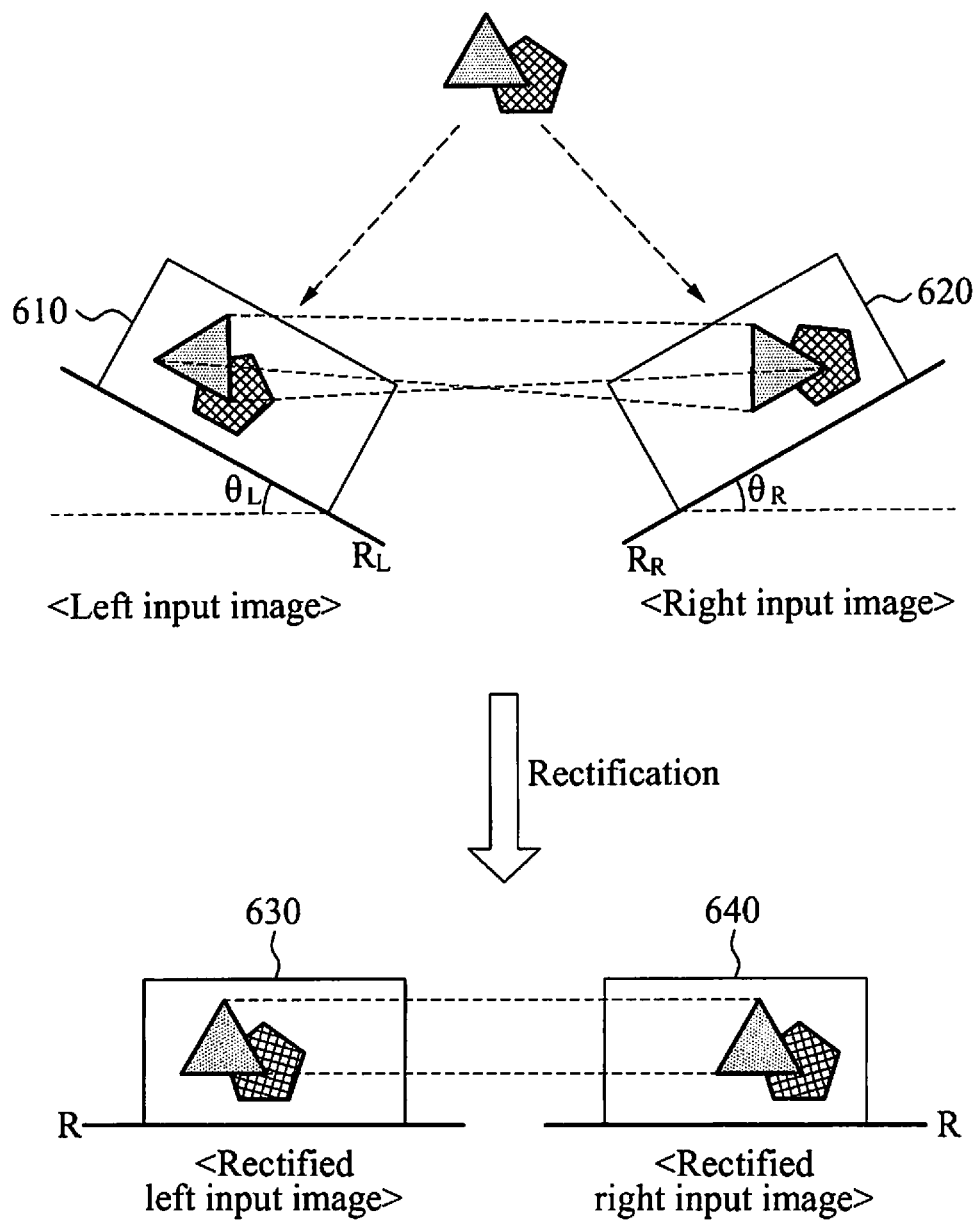
FIG. 6 illustrates examples of calibration information on input images and rectification information on rectified images according to example embodiments.

FIG. 6 illustrates examples of calibration information on input images and rectification information on rectified images according to example embodiments.

As described with reference to FIG. 3, the input images may include a left input image 610 and a right input image 620. The left input image 610 and the right input image 620 may be tilted at "$\theta_L$" and "$\theta_R$" respectively, compared to rectified images, for example, 630 and 640. $\theta_L$ and $\theta_R$ may be determined based on extrinsic camera parameters of each camera capturing the left input image 610 and the right input image 620.

The calibration information on the left input image 610 may correspond to a rotation matrix "$R_L$" used to rotate the left input image 610 at $-\theta_L$. Similarly, the calibration information on the right input image 620 may correspond to a rotation matrix "$R_R$" used to rotate the right input image 620 at $\theta_R$.

A rectified left input image 630 may be a rectified image of the left input image 610. Also, a rectified right input image 640 may be a rectified image of the right input image 620.

Subsequent to the rectification being performed as illustrated, the epipolar lines of the rectified left input image 530 and the rectified right input image 640 may become parallel to one another.

The rectification information on the left input image 610 and the right input image 620 may include a rectification matrix "R." The rectification matrix R may indicate a matrix in which the rotation matrix $R_L$ is rotated at $-\theta_L$ or the rotation matrix $R_R$ is rotated at $\theta_R$.

Calibration information "$R_L$" on the left input image 610, calibration information "$R_R$" on the right input image 620, and the rectification information R may be used to obtain homography information on each of the left input image 610 and the right input image 620. The homography information may be used to calculate a motion vector used to generate a new viewpoint image.

Technical descriptions provided with reference to FIGS. 1 through 5 may be applicable hereto and thus, repeated descriptions will be omitted here for brevity.

Figure 7:
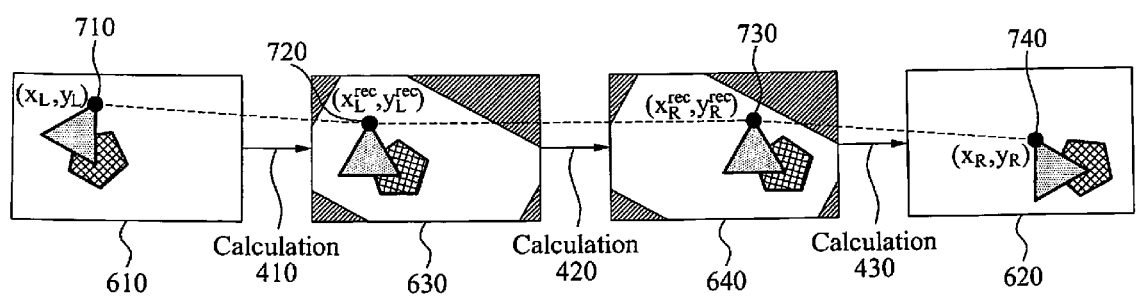
FIG. 7 illustrates a method of calculating a motion vector according to example embodiments.

FIG. 7 illustrates a method of calculating a motion vector according to example embodiments.

An example of the method of calculating the motion vector is described in operations 410 through 430 provided with reference to FIG. 4.

One of the left input image 610 of FIG. 6 and the right input image 620 of FIG. 6 may correspond to the first input image of FIG. 4, and a remaining image between the left input image 610 and the right input image 620 may correspond to the second input image of FIG. 4.

The method of calculating the motion vector described in operations 410 through 430 may be represented by Equation 4.

$$im_L(x_L,y_L) \to im_L(x_L^{rec},y_L^{rec}) \to im_L(x_L^{rec}+Dis_L^{rec}(x_L^{rec}, y_L^{rec}), y_L^{rec}) \to im_R(x_R,y_R) \quad \text{[Equation 4]}$$

In Equation 4, "$im_L(x_L, y_L)$" may indicate a coordinate of a first point 710. $im_L(x_L^{rec}, y_L^{rec})$ may indicate a coordinate of a second point 720. An arrow between $im_L(x_L,y_L)$ and $im_L(x_L^{rec}, y_L^{rec})$ may indicate calculation performed in operation 410 described with reference to FIG. 4. $im_L(x_L^{rec}+Dis_L^{rec}(x_L^{rec}, y_L^{rec}), y_L^{rec})$ may indicate a coordinate of a third point 730. An arrow between $im_L(x_L^{rec}, y_L^{rec})$ and $im_L(x_L^{rec}+Dis_L^{rec}(x_L^{rec}, y_L^{rec}), y_L^{rec})$ may indicate calculation performed in operation 420. $Dis_L^{rec}(x_L^{rec}, y_L^{rec})$ may indicate a disparity between points corresponding to the rectified left input image 630 of FIG. 6 and the rectified right input image 640 of FIG. 6, respectively, which is included in disparity information on the left input image 610 and the right input image 620. "$im_R(x_R,y_R)$" may indicate a coordinate of a fourth point 740. An arrow between $im_L(x_L^{rec}+Dis_L^{rec}(x_L^{rec}, y_L^{rec}), y_L^{rec})$ and $im_R(x_R,y_R)$ may indicate calculation performed in operation 430.

The arrows in Equation 4 may be inversely indicated. For example, a coordinate of a point of the left input image 610 corresponding to a coordinate of an arbitrary point of the right input image 620 may be calculated. A motion vector of the points corresponding to the left input image 610 and the right input image 620 may be calculated based on the calculation of the coordinates.

The motion vector calculated based on Equation 4 may be represented by Equation 5.

$$\begin{pmatrix} \nabla x \\ \nabla y \end{pmatrix} = \begin{pmatrix} x_L - x_R \\ y_L - y_R \end{pmatrix} \quad \text{[Equation 5]}$$

The image generator 230 may generate a new viewpoint image based on 1) the motion vector represented by Equation 5 and 2) the left input image 610 and the right input image 620. A method of generating the new viewpoint image will be further described with reference to FIG. 8.

The motion vector calculator 220 may calculate the motion vector indicating a motion between the coordinate of the first point 710 and the coordinate of the fourth point 740. The motion vector calculator 220 may calculate coordinates of the right input image 620 corresponding to all coordinates of the left input image 610, and calculate motion vectors of the all points of the left input image 610 and the points of the right input image 620 corresponding to the all points of the left input image 610.

The rectified left input image 630 and the rectified right input image 640 may be illustrated only to describe the method of calculating the motion vector performed in operations 410 through 430. Although not illustrated, the rectified left input image 630 and the rectified right input image 640 may not be output through the imaging apparatus 100 of FIG. 1.

Technical descriptions provided with reference to FIGS. 1 through 6 may be applicable hereto and thus, repeated descriptions will be omitted here for brevity.

Figure 8:
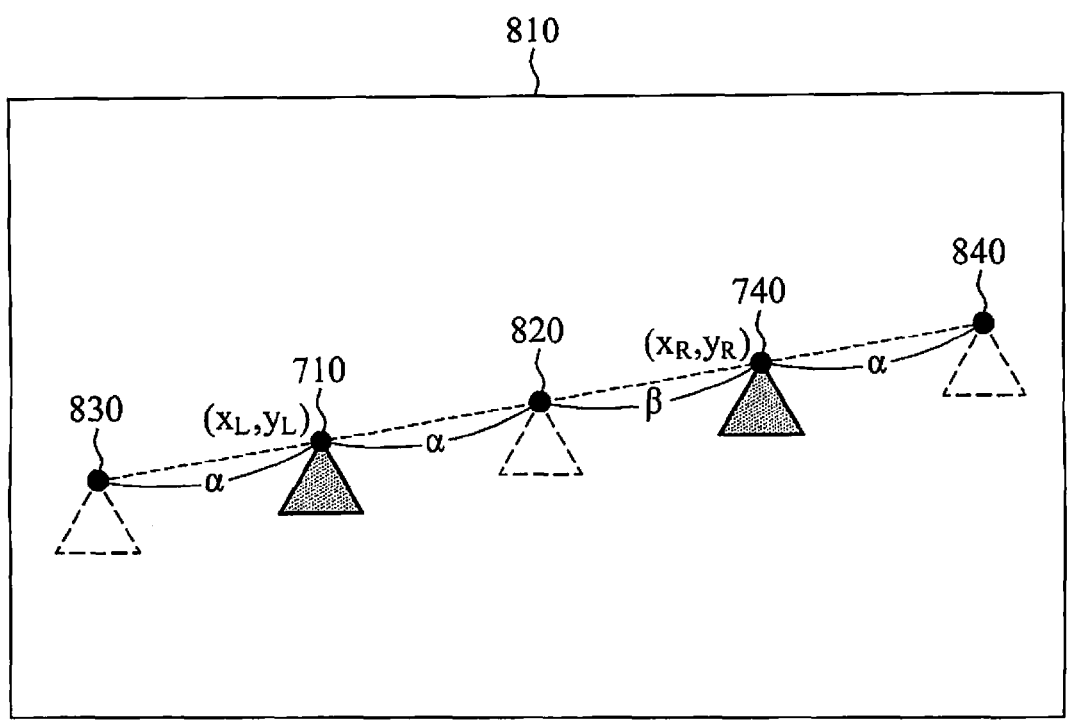
FIG. 8 illustrates a method of generating a new viewpoint image according to example embodiments.

FIG. 8 illustrates a method of generating a new viewpoint image according to example embodiments.

The method of generating the new viewpoint image based on a motion vector represented by Equation 5 provided with reference to FIG. 7 will be further described hereinafter.

As described with reference to FIG. 3, a viewpoint of the new viewpoint image may be present between a viewpoint of the left input image 610 of FIG. 6 and a viewpoint of the right input image 620 of FIG. 6. Alternatively, the viewpoint of the new viewpoint image may be present on a more left side than the viewpoint of the left input image 610 or present on a more right side than the viewpoint of the right input image 620.

The image generator 230 may generate, based on the motion vector, an interpolated image and an extrapolated image of the left input image 610 and the right input image 620 of input images.

An image plane 810 may indicate a plane of a screen to which each of the input images and new viewpoint images is output or a plane of a screen of a display device. As illustrated, objects corresponding to the input images and the new viewpoint images may be output at different positions on the image plane 810 based on a viewpoint of each of the input images and the new viewpoint images.

Objects marked with a line may indicate the left input image 610 and the right input image 620 of the input images. Also, objects marked with a dotted line may indicate the new viewpoint images generated by interpolation and extrapolation performed on the left input image 610 and the right input image 620.

As illustrated, a coordinate of an interpolation point 820 of a new viewpoint image corresponding to the first point 710 of FIG. 7 and the fourth point 740 of FIG. 7 may be located at a distance "$\alpha$" apart from a coordinate $im_L(x_L, y_L)$ of the first point 710 and a distance "$\beta$" apart from a coordinate $im_R(x_R, y_R)$ of the fourth point 740. The coordinate of the interpolation point 820 may be represented by Equation 6.

$$im_L(x_L, y_L) \rightarrow im_{I(\alpha,\beta)}\left(x_L + \frac{\alpha \cdot (x_R - x_L)}{\alpha + \beta}, y_L + \frac{\alpha \cdot (y_R - y_L)}{\alpha + \beta}\right) \quad \text{[Equation 6]}$$

The motion vector calculator 220 may use motion vectors of all points corresponding to the left input image 610 and the right input image 620, and calculate all interpolation points of the new viewpoint image corresponding to the all points as represented by Equation 6. The image generator 230 may generate the interpolated image of the left input image 610 and the right input image 620 based on all the calculated interpolation points.

Similarly, a coordinate of an extrapolation point 830 of the new viewpoint image corresponding to the first point 710 may be located at a distance "$\alpha$" apart from the coordinate $im_L(x_L, y_L)$ of the first point 710. The coordinate of the extrapolation point 830 of the new viewpoint image corresponding to the first point 710 may be represented by Equation 7.

$$im_L(x_L, y_L) \rightarrow im_{E(\alpha)}\left(x_L - \frac{\alpha}{(x_R - x_L)}, y_L - \frac{\alpha}{(y_R - y_L)}\right) \quad \text{[Equation 7]}$$

Also, a coordinate of an extrapolation point 840 of the new viewpoint image corresponding to the fourth point 740 may be located at a distance "$\alpha$" apart from the coordinate $im_R(x_R, y_R)$ of the fourth point 740. The coordinate of the extrapolation point 840 of the new viewpoint image corresponding to the fourth point 740 may be represented by Equation 8.

$$im_R(x_R, y_R) \rightarrow im_{E(\alpha)}\left(x_R + \frac{\alpha}{(x_R - x_L)}, y_R + \frac{\alpha}{(y_R - y_L)}\right) \quad \text{[Equation 8]}$$

The motion vector calculator 220 may use motion vectors of all points corresponding to the left input image 610 and the right input image 620, and calculate all the extrapolation points of the new viewpoint image corresponding to the all points as represented by Equations 7 and 8. The image generator 230 may generate the extrapolated images of the left input image 610 and the right input image 620 based on all the calculated extrapolation points.

Technical descriptions provided with reference to FIGS. 1 through 7 may be applicable hereto and thus, repeated descriptions will be omitted here for brevity.

Figure 9:
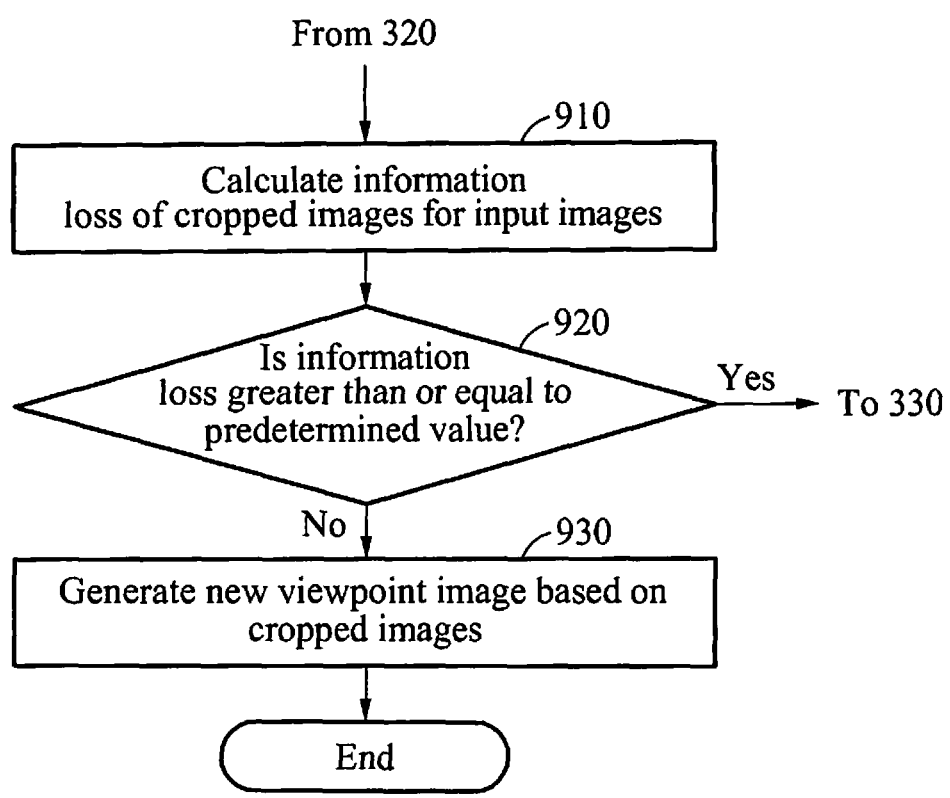
FIG. 9 is a flowchart illustrating an image processing method according to example embodiments.

FIG. 9 is a flowchart illustrating an image processing method according to example embodiments.

In operation 910, subsequent to operation 320 described with reference to FIG. 3 being performed, the information acquirer 210 calculates an information loss of cropped images for input images. The cropped images may be generated by cropping performed concurrent with rectification performed on the input images. The cropped images may be obtained from rectified input images and used to generate a new viewpoint image.

For example, when the new viewpoint image is generated based on the cropped images of the rectified input images, the information acquirer 210 may calculate the information loss of the cropped images for the input images. The information loss of the cropped images in operation 910 may indicate an information loss occurring between the input images and the cropped images.

The information loss of the cropped images for the input images may be calculated based on a size of a black region generated by performing the rectification on the input images or information quantity of a portion cropped from the rectified images.

In operation 920, the information acquirer 210 determines whether the information loss of the cropped images is greater than or equal to a predetermined and/or selected value.

Operations 325 through 350 described with reference to FIG. 3 may be selectively performed when the information loss of the cropped images is greater than or equal to the predetermined and/or selected value.

In operation 930, when the information loss of the cropped images is less than the predetermined and/or selected value, the image generator 230 generates a new viewpoint image based on the cropped images.

Operations 910 through 930 may be selectively performed. Operations 910 through 930 may not be performed to prevent the information loss of the new viewpoint image for the input images.

Technical descriptions provided with reference to FIGS. 1 through 8 may be applicable hereto and thus, repeated descriptions will be omitted here for brevity.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing method, comprising:
generating rectification information by performing rectification on input images with different viewpoints based on calibration information and the input images;
calculating an information loss of cropped images for the input images, the cropped images being obtained by cropping performed concurrently with the rectification;
calculating a motion vector of points corresponding to the input images when the information loss is greater than or equal to a value, the calculating the motion vector being based on homography information and disparity information on the input images, the homography information being based on the calibration information and the rectification information on the input images; and
generating a new viewpoint image from the input images based on the motion vector when the information loss is greater than or equal to the value.

2. The method of claim 1, wherein the calibration information comprises rotation information for the rectification of the input images.

3. The method of claim 1, wherein the rectification information comprises parameters associated with the rectified input images.

4. The method of claim 1, wherein the input images comprise a left input image and a right input image, and
a viewpoint part of the new viewpoint image is between a viewpoint part of the left input image and a viewpoint part of the right input image.

5. The method of claim 1, wherein the input images include a first input image and a second input image,
the homography information includes first homography information on the first input image and second homography information on the second input image, and
the calculating of the motion vector includes,
calculating a second point of a first rectified image corresponding to a first point of the first input image based on the first homography information;
calculating a third point of a second rectified image corresponding to the second point based on the disparity information;
calculating a fourth point of the second input image corresponding to the third point based on the second homography information; and
calculating the motion vector, the motion vector indicating a motion between the first point and the fourth point.

6. The method of claim 1, further comprising:
obtaining the calibration information, the rectification information, and the disparity information.

7. The method of claim 6, wherein the obtaining the calibration information, the rectification information, and the disparity information comprises:
receiving at least one set of information among the calibration information, the rectification information, and the disparity information; and
generating remaining information, excluding the at least one received set of information, based on the at least one received set of information and the input images.

8. The method of claim 6, wherein the obtaining the calibration information, the rectification information, and the disparity information comprises:
receiving the calibration information.

9. The method of claim 8, wherein the obtaining the calibration information, the rectification information, and the disparity information comprises:
obtaining the disparity information by calculating disparities based on the rectification.

10. A non-transitory computer-readable medium comprising a program for instructing a computer to perform the method of claim 1.

11. An imaging apparatus, comprising:
at least one processor configured to execute computer-readable instructions to,
generate rectification information by performing rectification on input images with different viewpoints based on the calibration information and the input images,
calculate an information loss of cropped images for the input images, the cropped images based on cropping performed concurrent with the rectification,
calculate a motion vector of points corresponding to the input images when the information loss is greater than or equal to a value, the least one processor configured to execute the computer-readable instructions to calculate the motion vector based on homography information and disparity information on the input images, the homography information being based on the calibration information and the rectification information on the input images, and generate a new viewpoint image from the input images based on the motion vector.

12. The imaging apparatus of claim 11, wherein the calibration information includes rotation information for the rectification of the input images.

13. The imaging apparatus of claim 11, wherein the input images include a first input image and a second input image, and the least one processor is configured to execute the computer-readable instructions to calculate a second point of a first rectified image corresponding to a first point of the first input image based on a part of the homography information corresponding to the first input image, calculate a third point of a second rectified image corresponding to the second point based on the disparity information, calculate a fourth point of the second input image corresponding to the third point based on another part of the homography information corresponding to the second input image, and calculate the motion vector indicating a motion between the first point and the fourth point.

14. The imaging apparatus of claim 11, wherein the least one processor is configured to execute the computer-readable instructions to obtain the homography information on the input images based on the calibration information and the rectification information.

15. The imaging apparatus of claim 14, wherein the least one processor is configured to execute the computer-readable instructions to obtain the calibration information, the rectification information, and the disparity information, and obtain the homography information based on the obtained calibration information and the obtained rectification information.

16. The imaging apparatus of claim 14, wherein the least one processor is configured to execute the computer-readable instructions to receive at least one set of information among the calibration information, the rectification information, and the disparity information, and generate remaining information, excluding the at least one received set of information, based on the at least one received set of information and the input images.

17. The imaging apparatus of claim 14, wherein the least one processor is configured to execute the computer-readable instructions to receive the calibration information.

18. The imaging apparatus of claim 17, wherein the least one processor is configured to execute the computer-readable instructions to obtain the disparity information by calculating disparities of images generated by the rectification.

* * * * *